(12) United States Patent
Kiyosawa et al.

(10) Patent No.: US 9,420,206 B2
(45) Date of Patent: Aug. 16, 2016

(54) IMAGE-PICKUP APPARATUS AND METHOD OF DETECTING DEFECTIVE PIXEL THEREOF

(71) Applicant: CANON KABUSHIKI KAISHA, Tokyo (JP)

(72) Inventors: Kazuyoshi Kiyosawa, Inagi (JP); Yoshiaki Honda, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/697,879

(22) Filed: Apr. 28, 2015

(65) Prior Publication Data

US 2015/0271423 A1 Sep. 24, 2015

Related U.S. Application Data

(63) Continuation of application No. 13/814,113, filed as application No. PCT/JP2011/068642 on Aug. 11, 2011, now Pat. No. 9,041,854.

(30) Foreign Application Priority Data

Aug. 19, 2010 (JP) ................................ 2010-184168

(51) Int. Cl.
*H04N 5/367* (2011.01)
*H04N 5/217* (2011.01)

(52) U.S. Cl.
CPC ............. *H04N 5/367* (2013.01); *H04N 5/2178* (2013.01); *H04N 5/3675* (2013.01)

(58) Field of Classification Search
CPC .................................... H04N 5/3745–5/37457
See application file for complete search history.

(56) References Cited

U.S. PATENT DOCUMENTS

| | | | | |
|---|---|---|---|---|
| 2003/0063203 | A1* | 4/2003 | Ohno | H04N 5/367 348/247 |
| 2005/0219390 | A1* | 10/2005 | Tajima | H04N 5/3675 348/246 |
| 2006/0012695 | A1* | 1/2006 | Chang | H04N 5/2176 348/246 |
| 2008/0117318 | A1* | 5/2008 | Aoki | H04N 5/367 348/246 |
| 2008/0273101 | A1* | 11/2008 | Takenaka | H04N 5/361 348/243 |

* cited by examiner

*Primary Examiner* — Jason Flohre
(74) *Attorney, Agent, or Firm* — Cowan, Liebowitz & Latman, P.C.

(57) ABSTRACT

An image pickup apparatus which can detect, when pixels have a structure in which part of electrical construction is shared therebetween, a defective pixel by taking into account a high possibility of the other pixels sharing the part of electrical construction becoming defective pixels, thereby making it possible to obtain an excellent image. A ROM stores in advance position information on each defective pixel. A defective pixel-detecting section detects a new defective pixel on which position information is not stored by the storage unit, from the pixels forming each pixel group, by performing one of different types of defective pixel detection processing. A system controller causes the defective pixel-detecting section to execute one of the different types of detection processing, according to the number of defective pixels which are included in each pixel group and on which the position information is stored in the storage unit.

5 Claims, 12 Drawing Sheets

| B | G | B | G | B | G | B |
|---|---|---|---|---|---|---|
| G | R | G | R | G | R | G |
| B | G | B | G | B | G | B |
| G | R | G | R | G | R | G |
| B | G | B | G | B | G | B |
| G | R | G | R | G | R | G |
| B | G | B | G | B | G | B |
| G | R | G | R | G | R | G |

| B00 | G01 | B02 | G03 | B04 | G05 | B06 |
|-----|-----|-----|-----|-----|-----|-----|
| G10 | R11 | G12 | R13 | G14 | R15 | G16 |
| B20 | G21 | B22 | G23 | B24 | G25 | B26 |
| G30 | R31 | G32 | R33 | G34 | R35 | G36 |
| B40 | G41 | B42 | G43 | B44 | G45 | B46 |
| G50 | R51 | G52 | R53 | G54 | R55 | G56 |
| B60 | G61 | B62 | G63 | B64 | G65 | B66 |

| B00 | G01 | B02 | G03 | B04 | G05 | B06 |
|-----|-----|-----|-----|-----|-----|-----|
| G10 | R11 | G12 | R13 | G14 | R15 | G16 |
| B20 | G21 | B22 | G23 | B24 | G25 | B26 |
| G30 | R31 | G32 | R33 | G34 | R35 | G36 |
| B40 | G41 | B42 | G43 | B44 | G45 | B46 |
| G50 | R51 | G52 | R53 | G54 | R55 | G56 |
| B60 | G61 | B62 | G63 | B64 | G65 | B66 |

FIG.8

| B00 | G01 | B02 | G03 | B04 | G05 | B06 |
| G10 | R11 | G12 | R13 | G14 | R15 | G16 |
| B20 | G21 | B22 | G23 | B24 | G25 | B26 |
| G30 | R31 | G32 | R33 | G34 | R35 | G36 |
| B40 | G41 | B42 | G43 | B44 | G45 | B46 |
| G50 | R51 | G52 | R53 | G54 | R55 | G56 |
| B60 | G61 | B62 | G63 | B64 | G65 | B66 |

*FIG.9*

| B00 | G01 | B02 | G03 | B04 | G05 | B06 |
|-----|-----|-----|-----|-----|-----|-----|
| G10 | R11 | G12 | R13 | G14 | R15 | G16 |
| B20 | G21 | B22 | G23 | B24 | G25 | B26 |
| G30 | R31 | G32 | R33 | G34 | R35 | G36 |
| B40 | G41 | B42 | G43 | B44 | G45 | B46 |
| G50 | R51 | G52 | R53 | G54 | R55 | G56 |
| B60 | G61 | B62 | G63 | B64 | G65 | B66 |

*FIG.10*

| B00 | G01 | B02 | G03 | B04 | G05 | B06 |
|-----|-----|-----|-----|-----|-----|-----|
| G10 | R11 | G12 | R13 | G14 | R15 | G16 |
| B20 | G21 | B22 | G23 | B24 | G25 | B26 |
| G30 | R31 | G32 | R33 | G34 | R35 | G36 |
| B40 | G41 | B42 | G43 | B44 | G45 | B46 |
| G50 | R51 | G52 | R53 | G54 | R55 | G56 |
| B60 | G61 | B62 | G63 | B64 | G65 | B66 |

*FIG.12*

IMAGE-PICKUP APPARATUS AND METHOD OF DETECTING DEFECTIVE PIXEL THEREOF

CROSS-REFERENCE TO RELATED APPLICATIONS

This application is a continuation of application Ser. No. 13/814,113, filed Feb. 4, 2013, now U.S. Pat. No. 9,041,854; which is a national phase under 35 U.S.C. 371 of International Application No. PCT/JP2011/068642, filed Aug. 11, 2011; the entire disclosures of which are hereby incorporated by reference.

TECHNICAL FIELD

The present invention relates to an image pickup apparatus including an image pickup device, such as a CCD image sensor and a CMOS image sensor, and a method of detecting a defective pixel of the image pickup apparatus.

BACKGROUND ART

In recent years, an image pickup apparatus tends to increase in the number of pixels. Further, there is an increasing demand for high-speed reading of image data as the number of cells is increased by reduction of cell size or so as to adapt to a moving image and the like.

To meet the demand, there has been proposed an image pickup apparatus in which a plurality of pixels (photoelectric conversion elements) adjacent to each other share part of electrical construction therebetween (see e.g. PTL (Patent Literature) 1). For example, a floating diffusion unit (FD) (211), a MOS amplifier (212), a selection switch (213) and a reset switch (210) are shared between photo diodes (202 to 205) of the respective pixels and transfer switches (206 to 209) (see FIG. 3).

Here, in an image pickup device used in the image pickup apparatus, defective pixels are sometimes generated e.g. in a manufacturing process. Outputs from the defective pixels are different in output level from other normal pixels, causing image quality degradation.

On the other hand, there has been proposed a technique of correcting defective pixels of the image pickup device, information on which is stored in advance, checking the image pickup device as occasion demands to thereby extract defective pixels different in pixel output from the other pixels and store information thereon, and correcting the new defective pixels thus extracted as well (see PTL 2).

Further, there has been proposed another technique of correcting defective pixels in real time, by extracting defective pixels based on a difference in signal level between a predetermined pixel of an image picked up and pixels of the same color adjacent to the predetermined pixel, and a difference in signal level between pixels of the same color of a different kind existing around the predetermined pixel (see PTL 3).

Furthermore, there has been proposed still another technique in which when storing the address of a defective pixel, there are stored not only the address of the defective pixel but also a bit of data for determining whether a plurality of defective pixels occur in succession thereto, whereby as for defective pixels occurring in succession, only the address of a leading one of the defective pixels is stored (see PTL 4).

Further, a phenomenon is known in which the increase in number of the pixels of the image pickup apparatus produces pixels suffering from a flickering defect in which when the image pickup device is repeatedly read out under the same conditions (the same temperature, the same accumulation time period, and light blocking), the dark charge level of an image signal read out undergoes extreme rises and falls (see PTL 5).

CITATION LIST

Patent Literature

PTL 1: Japanese Patent Laid-Open Publication No. H10-256521
PTL 2: Japanese Patent Laid-Open Publication No. 2002-125154
PTL 3: Japanese Patent Laid-Open Publication No. H06-30425
PTL 4: Japanese Patent Laid-Open Publication No. 2008-278394
PTL 5: Japanese Patent Laid-Open Publication No. 2003-037781

SUMMARY OF INVENTION

Technical Problem

However, the above-described conventional image pickup apparatus suffers from the following problems: There is a case where due to the structure of the image pickup device, noise charge is sometimes generated in the floating diffusion unit, and the noise charge is applied to four vertically-consecutive pixels that share part of electrical construction therebetween. In this case, all of a plurality of adjacent pixels sometimes appear as pixels suffering from the flickering defect described in PTL 5. Such a flickering defect does not always occur periodically, but depending on the number of times of reading the image pickup device, the flickering defect occurs with a high frequency e.g. once in several times of reading or with a low frequency e.g. once in several years. Further, the flickering defect does not depend on the temperature or the accumulation time period.

Further, in detecting a defective pixel, as described in PTL 2, when signal correction is performed by simply using the signals of adjacent pixels, there is a possibility that pixels to be used for correction are not properly extracted.

Further, as described in PTL 4, if it is determined that all the pixels that share the part of electrical construction therebetween are defective pixels, assuming that the defective pixels suffer from the flickering defect, even when a signal of a read one of the pixels shows a correct output, the signal of the pixel is corrected or replaced by output signals of pixels around the pixel. This can result in the degraded image quality.

In the case of such a structure of the pixels sharing part of electrical construction, it is necessary to properly detect defective pixels caused by the above-mentioned factors.

The present invention has been made in view of these circumstances, and provides an image pickup apparatus which is, when pixels have a structure in which part of electrical construction is shared between them, capable of detecting a defective pixel by taking into account a high possibility of the other pixels sharing the part of electrical construction becoming defective pixels, thereby making it possible to obtain an excellent image. Further, the present invention provides a method of detecting defective pixels.

Solution to Problem

Accordingly, in a first aspect of the present invention, there is provided an image pickup apparatus including a solid image pickup device for converting an optical image formed by a plurality of pixel groups arranged two-dimensionally to an electric signal and outputting the electric signal, each pixel group being formed by a plurality of pixels having a pixel structure in which two or more pixels share part of electrical construction therebetween, comprising a storage unit configured to store position information on each of defective pixels in advance, a defective pixel-detecting unit configured to detect a new defective pixel on which position information is not stored in the storage unit, out of the plurality of pixels forming each pixel group, by one of a plurality of different types of defective pixel detection processing, and a control unit configured to cause the defective pixel-detecting unit to execute the one of the plurality of types of defective pixel detection processing, according to the number of defective pixels which are included in each pixel group and on which the position information is stored in the storage unit.

Accordingly, in a second aspect of the present invention, there is provided an image pickup apparatus including a solid image pickup device for converting an optical image formed by a plurality of pixel groups arranged two-dimensionally to an electric signal and outputting the electric signal, each pixel group being formed by a plurality of pixels having a pixel structure in which two or more pixels share part of electrical construction therebetween, comprising a storage unit configured to store position information on each of defective pixels in advance, a defective pixel-detecting unit configured to detect a new defective pixel on which position information is not stored in the storage unit, out of the plurality of pixels forming each pixel group, by a plurality of different types of defective pixel detection processing, and a control unit configured to add respective results of the plurality of different types of defective pixel detection processing by weighted averaging dependent on the number of defective pixels which are included in each pixel group and on which the position information is stored in the storage unit, and determine based on a result of the addition whether or not a detection target pixel is the new defective pixel.

Accordingly, in a third aspect of the present invention, there is provided a method of detecting a defective pixel for an image pickup apparatus including a solid image pickup device for converting an optical image formed by a plurality of pixel groups arranged two-dimensionally to an electric signal and outputting the electric signal, each pixel group being formed by a plurality of pixels having a pixel structure in which two or more pixels share part of electrical construction therebetween, comprising detecting a new defective pixel on which position information is not stored in a storage unit, out of the plurality of pixels forming each pixel group, by one of a plurality of different types of defective pixel detection processing, and causing the detecting to be executed by the one of the plurality of types of defective pixel detection processing, according to the number of defective pixels which are included in each pixel group and on which the position information is stored in the storage unit.

Accordingly, in a fourth aspect of the present invention, there is provided a method of detecting a defective pixel for an image pickup apparatus including a solid image pickup device for converting an optical image formed by a plurality of pixel groups arranged two-dimensionally to an electric signal and outputting the electric signal, each pixel group being formed by a plurality of pixels having a pixel structure in which two or more pixels share part of electrical construction therebetween, comprising detecting a new defective pixel on which position information is not stored in a storage unit, out of the plurality of pixels forming each pixel group, by a plurality of different types of defective pixel detection processing, and adding respective results of the plurality of different types of defective pixel detection processing by weighted averaging dependent on the number of defective pixels which are included in each pixel group and on which the position information is stored in the storage unit, and determining based on a result of the addition whether or not a detection target pixel is the new defective pixel.

Advantageous Effects of Invention

According to the present invention, it is possible, when pixels have a structure in which part of electrical construction is shared between them, to detect a defective pixel by taking into account a high possibility of the other pixels sharing the part of electrical construction becoming defective pixels, and thereby obtain an excellent image.

The features and advantages of the invention will become more apparent from the following detailed description taken in conjunction with the accompanying drawings.

DESCRIPTION OF EMBODIMENTS

The present invention will now be described in detail below with reference to the accompanying drawings showing embodiments thereof.

A description will be given of embodiments of an image pickup apparatus and a method of detecting a defective pixel of the image pickup apparatus according to the present invention with reference to the drawings.

Figure 1:
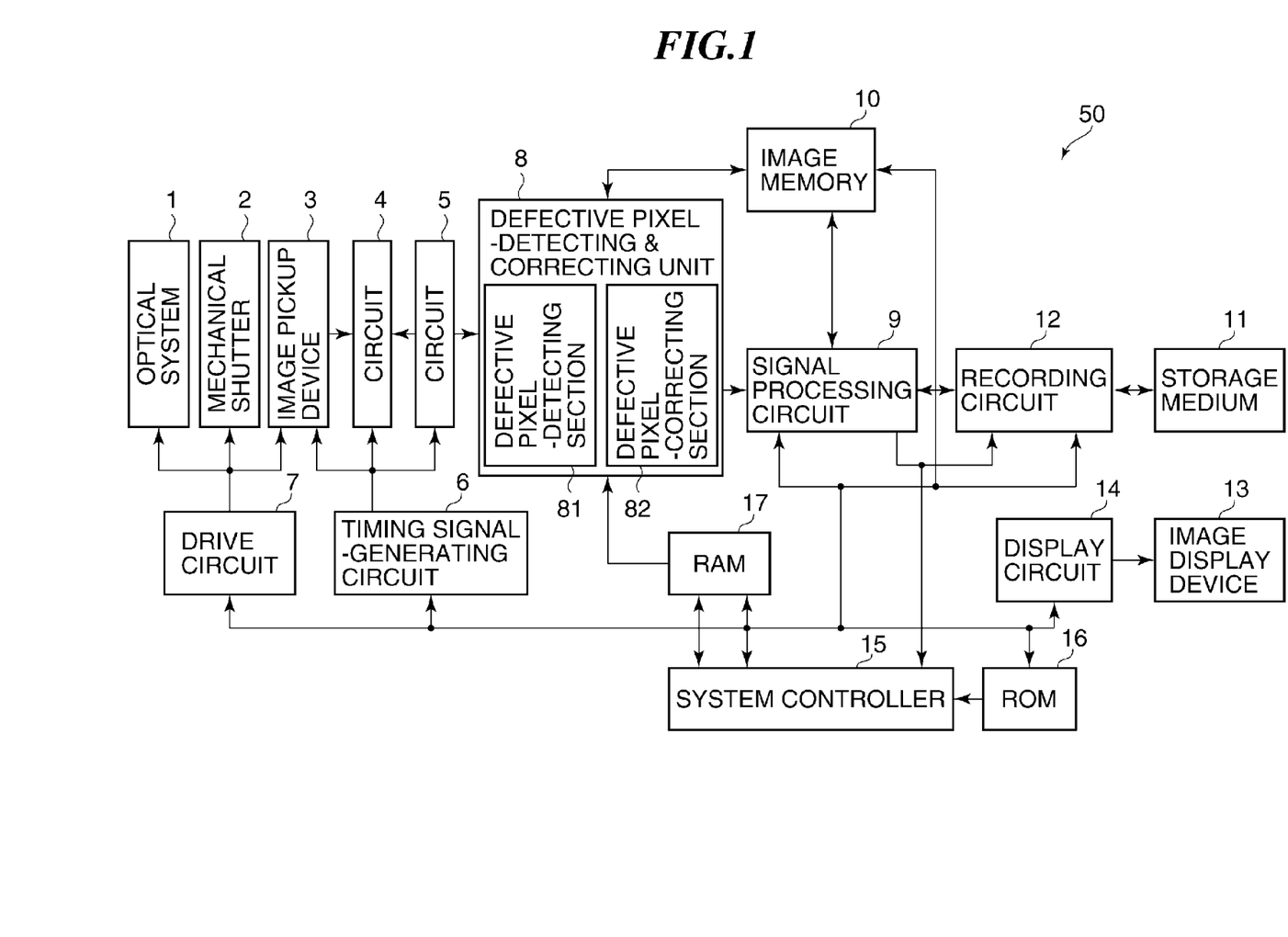
[FIG. 1] schematic block diagram of an image pickup apparatus according to a first embodiment.

FIG. 1 is a schematic block diagram of the image pickup apparatus according to a first embodiment. The image pickup apparatus 50 according to the present embodiment includes an optical system 1 comprising lenses, not shown, and a diaphragm, not shown, a mechanical shutter 2 and an image pickup device 3.

Figure 2:
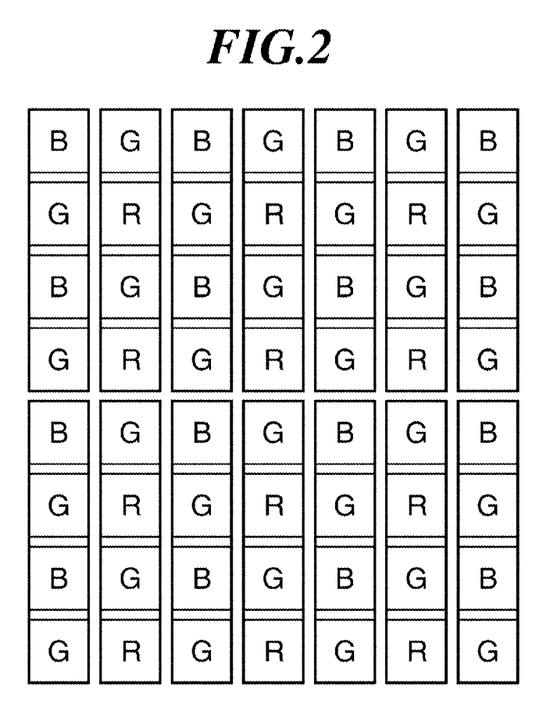
[FIG. 2] A view of an example of a pixel array included in an image pickup device.

In the present embodiment, a CMOS (complementary metal oxide semiconductor) area sensor arranged in the Bayer array is used as the image pickup device 3. FIG. 2 is a view of an example of a pixel array included in the image pickup device 3. The image pickup device (solid image pickup device) 3 includes a plurality of pixel groups arranged two-dimensionally in the vertical and horizontal directions. In FIG. 2, symbols R (red), G (green), and B (blue) represent colors received after passing through color filters of R, G and B (red, green, and blue) colors formed on respective pixels of the image pickup device 3.

Figure 3:
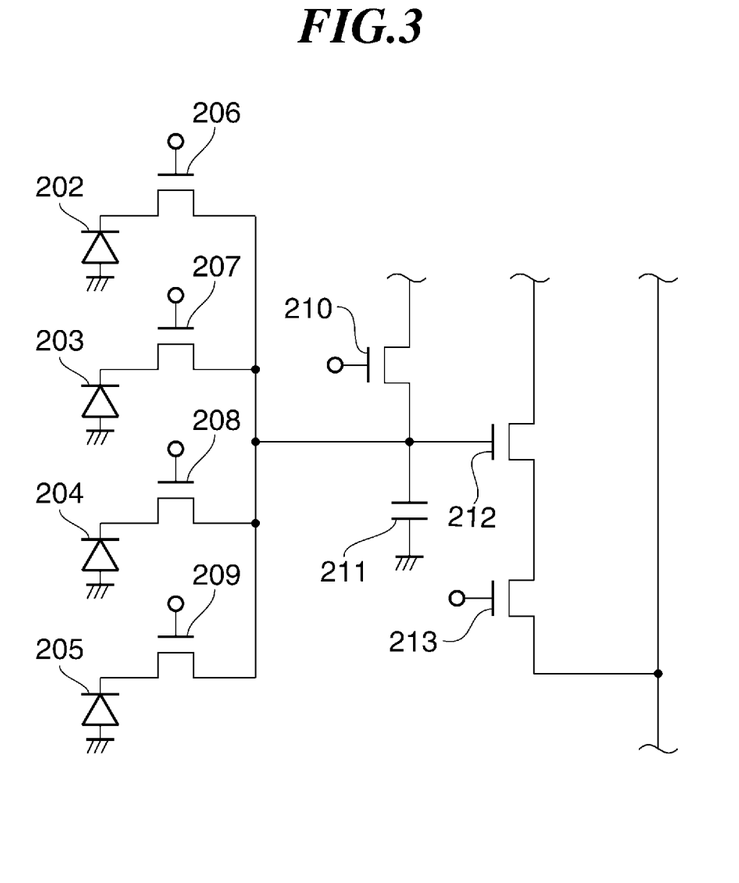
[FIG. 3] A view of an equivalent circuit of a pixel group having a pixel structure in which four pixels arranged adjacent to each other in a vertical direction share a floating diffusion unit.

Further, in the image pickup device 3 according to the present embodiment, a plurality of (not smaller than 2) pixels arranged adjacent to each other in one direction (in the vertical direction, in the illustrated example) share part of electrical construction therebetween. FIG. 3 is a view of an equivalent circuit of a pixel group having a pixel structure in which four pixels arranged adjacent to each other in the vertical direction share a floating diffusion unit (FD) 211. In this pixel structure, the floating diffusion unit 211, a MOS amplifier 212, a selection switch 213 and a reset switch 210 are shared between photo diodes (photoelectric conversion elements) 202 to 205 of the respective pixels and transfer switches 206 to 209. The floating diffusion unit 211 (holding unit) is provided for common use by the pixels of a pixel group having a pixel structure in which the pixels arranged adjacent to each other in the vertical direction share part of electrical construction therebetween, and temporarily stores electric charge generated in the photo diode of each pixel.

An object image (optical image) formed on the pixel groups of the image pickup device 3 is converted by the image pickup device 3 to an electric signal. Then, the electric signal (image signal) delivered from the image pickup device 3 is input to a CDS (co-related double sampling) circuit 4.

The CDS circuit 4 performs analog signal processing on the input image signal. An A/D converter 5 converts an analog signal from the CDS circuit 4 to a digital signal. A timing signal-generating circuit 6 generates signals for causing the image pickup device 3, the CDS circuit 4 and the A/D converter 5 to operate. A drive circuit 7 drives the optical system 1, the mechanical shutter 2 and the image pickup device 3.

The image signal that has been converted to the digital signal by the A/D converter 5 is input to a defective pixel-detecting & correcting unit 8. The defective pixel-detecting & correcting unit 8 comprises a defective pixel-detecting section 81 and a defective pixel-correcting section 82. Upon receipt of the digital image signal, the defective pixel-detecting section 81 (defective pixel detecting unit) detects a defective pixel from a plurality of pixels forming each of a plurality of pixel groups, and outputs information on the defective pixel as defective pixel information to the defective pixel-correcting section 82. The defective pixel-detecting section 81 mainly detects defective pixels, such as a flickering defective pixel, position information of which is not stored in a ROM 16, referred to hereinafter.

The defective pixel-correcting section 82 performs defective pixel correction processing on the input image signal according to the defective pixel information output from the defective pixel-detecting section 81. Detailed description of the defective pixel-detecting & correcting unit 8 will be given hereinafter.

An output from the defective pixel-detecting & correcting unit 8 is input to a signal processing circuit 9. The signal processing circuit 9 performs required digital signal processing on the output from the defective pixel-detecting & correcting unit 8, and then outputs the processed image signal as image data.

An image memory 10 is an area for temporarily storing a video signal being subjected to the digital signal processing by the signal processing circuit 9, or storing image data. A storage medium 11 is a memory card or the like which is removably mounted on the image pickup apparatus 50.

A recording circuit 12 records image data obtained by the digital signal processing by the signal processing circuit 9 in the storage medium 11. An image display device 13 displays the image data obtained by the digital signal processing by the signal processing circuit 9 via a display circuit 14.

A system controller 15 controls the overall operation of the image pickup apparatus 50. In the present embodiment, the system controller 15 is formed e.g. by a CPU. The ROM 16 (storage unit) stores a program describing a method of controlling the image pickup apparatus 50, executed by the system controller 15, control data, such as parameters and tables, used during execution of the program, and correction data, such as addresses (position information) of defective pixels included in the pixel groups of the image pickup device 3.

In the present embodiment, out of the above-mentioned correction data, correction data items associated with respective sensors checked and sent by a manufacturing plant that manufactures the image pickup device 3 are stored as defective pixel-correcting data in the ROM 16. But, the method of acquiring the defective pixel-correcting data is not limited to this. For example, new information on defective pixels may be created by the defective pixel-detecting section 81 and stored in the ROM 16 after the image pickup device 3 has been incorporated in the image pickup apparatus 50.

The program, the control data, the correction data, such as the addresses of the defective pixels, and so forth stored in the ROM 16 are transferred to a RAM 17 for temporary storage therein. Further, additional programs and data are transferred from the ROM 16 to the RAM 17, as required. Further, the system controller 15 sometimes directly reads out data from the ROM 16, for use.

Next, a description will be given of a shooting operation performed by using the mechanical shutter 2 in the image pickup apparatus 50 configured as described above. First, the optical system 1 drives the diaphragm and the lenses via the drive circuit 7 according to a control signal from the system controller 15, to thereby form an object image set to appropriate brightness, on the image pickup device 3.

The mechanical shutter 2 is driven by the drive circuit 7 by a control signal from the system controller 15 such that light to the image pickup device 3 is blocked in accordance with the operation of the image pickup device 3, to thereby expose the image pickup device 3 to the light during required exposure time. At this time, when the image pickup device 3 has an electronic shutter function, the required exposure time may be ensured by using the image pickup device 3 in combination with the mechanical shutter 2.

The image pickup device 3 is driven by drive pulses based on operation pulses generated by the timing signal-generating circuit 6 controlled by the system controller 15, and converts an object image to an electric signal by photoelectric conversion, to thereby output the electric signal as an analog image signal.

The CDS circuit 4 removes clock-synchronous noise from the electric signal (analog image signal) delivered from the image pickup device 3 using the operation pulses generated by the timing signal-generating circuit 6 controlled by the system controller 15. Further, the analog image signal from which the clock-synchronous noise has been removed is converted to a digital image signal by the A/D converter 5.

The digital image signal is once stored in the image memory 10 under the control of the system controller 15, and is then input to the defective pixel-detecting & correcting unit 8. The defective pixel-detecting section 81 detects a defective pixel from the input digital image signal, and outputs the result of the detection as information of the defective pixel to the defective pixel-correcting section 82.

The defective pixel-correcting section 82 performs defective pixel correction processing on the input digital image signal based on defective pixel correction data, such as the addresses of defective pixels stored in the ROM 16, and the defective pixel information output from the defective pixel-detecting section 81.

The signal processing circuit 9 performs image processing, such as color conversion, white balance, and gamma correction, resolution conversion processing, image compression processing, and so forth on the digital image signal having been subjected to the defective pixel detection & correction processing by the defective pixel-detecting & correcting unit 8.

The image data stored in the image memory 10 is converted to data suitable for the storage medium 11 (e.g. file system data having a hierarchical structure) by the recording circuit 12. This converted image data is recorded in the storage medium 11. Further, after being subjected to the resolution conversion processing in the signal processing circuit 9, the converted image data is converted to a signal suitable for the image display device 13 (e.g. an NTSC analog signal) by the display circuit 14, and is displayed on the image display device 13.

The signal processing circuit 9 may directly deliver the digital image signal to the image memory 10 or the recording circuit 12 as image data without subjecting the digital image signal to the above-described image processing by the control signals from the system controller 15.

Next, a detailed description will be given of defective pixel detection processing performed in a case where the image pickup device 3 comprises pixel groups each having a pixel structure in which pixels arranged adjacent to each other in the vertical direction share part of electrical construction therebetween. In the illustrated example, pixels B22, G32, B42, and G52 of the image pickup device 3 form a pixel group having a pixel structure in which the four pixels share the floating diffusion unit 211. Now, a description will be given of a case where a detection target pixel being subjected to defective pixel detection is the pixel G32, by way of example (see FIG. 5).

Further, various methods for detecting defective pixels whenever an image is picked up have been proposed, as disclosed in Patent Literature 3. In the present embodiment, however, a description will be given of median filtering for extracting a central value of data of images having the same color in a range of 5×5 pixels in the vertical and horizontal directions, by way of example.

Figure 4:
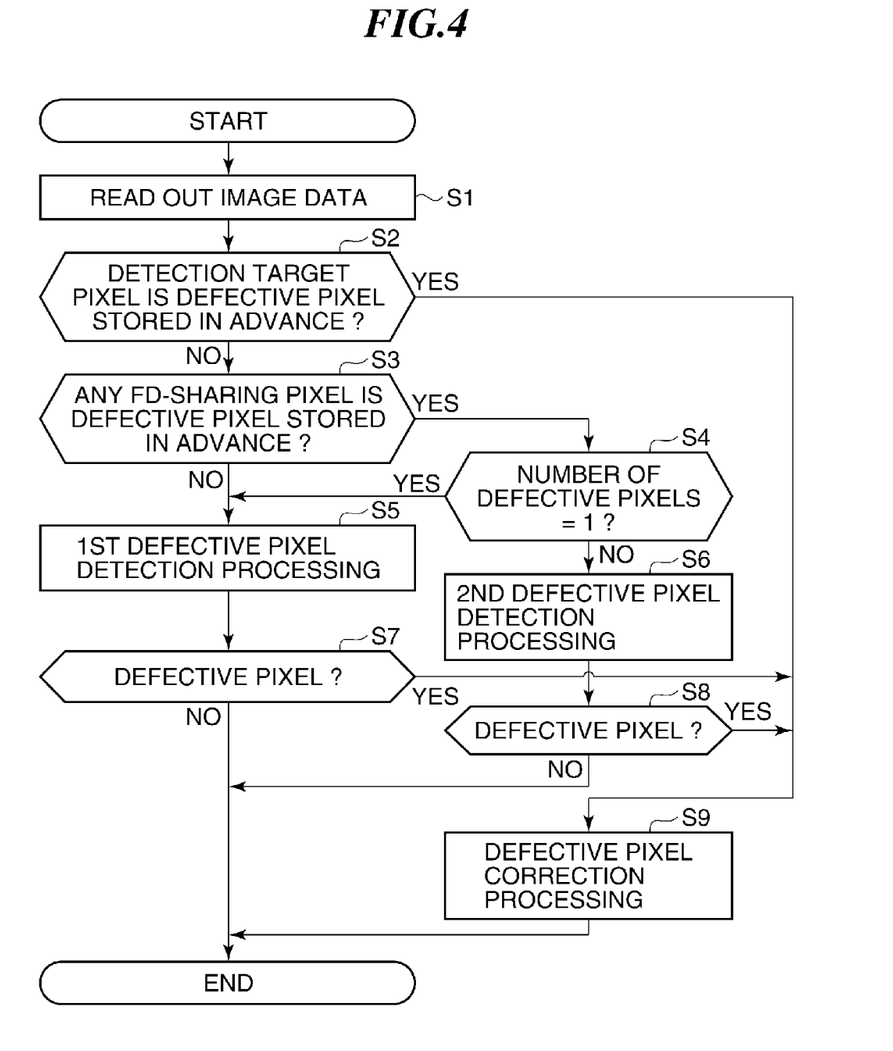
[FIG. 4] A flowchart of a defective pixel detection process in a case where the image pickup device comprises pixel groups each having a pixel structure in which pixels share part of electrical construction therebetween.

FIG. 4 is a flowchart of a defective pixel detection process in the case where the image pickup device 3 comprises pixel groups each having the pixel structure in which the pixels arranged adjacent to each other in the vertical direction share part of electrical construction therebetween. A program for this defective pixel detection process is stored in the ROM 16, as described above, and is executed by the system controller 15 (CPU: control unit). In the illustrated example, the detection target pixel is the pixel G32.

First, the system controller 15 reads out picked-up image data from the image memory 10 to the defective pixel-detecting & correcting unit 8 (step S1). The defective pixel-detecting section 81 refers to the defective pixel correction data stored in the ROM 16, in advance, to thereby determine whether or not the detection target pixel G32 is a defective pixel (step S2).

If the detection target pixel G32 is a defective pixel the address (position information) of which is stored in advance in the ROM 16 (storage unit), the detection target pixel G32 is required to be subjected to the defective pixel correction processing, and hence the system controller 15 causes the pixel G32 to be subjected to the defective pixel correction processing by the defective pixel-correcting section 82 (step S9). In the defective pixel correction processing, correction of the defective pixel is performed using a value obtained by pre-interpolation or interpolation from adjacent same color pixels. After that, the system controller 15 terminates the present process.

On the other hand, in the step S2, if the detection target pixel G32 is not a defective pixel the address of which is stored in advance in the ROM 16, the system controller 15 determines using the defective pixel-detecting section 81 whether or not any of the pixels B22, B42, and G52 sharing the floating diffusion unit 211 with the detection target pixel G32 is a defective pixel the address of which is stored in advance in the ROM 16 (step S3).

Figure 5:
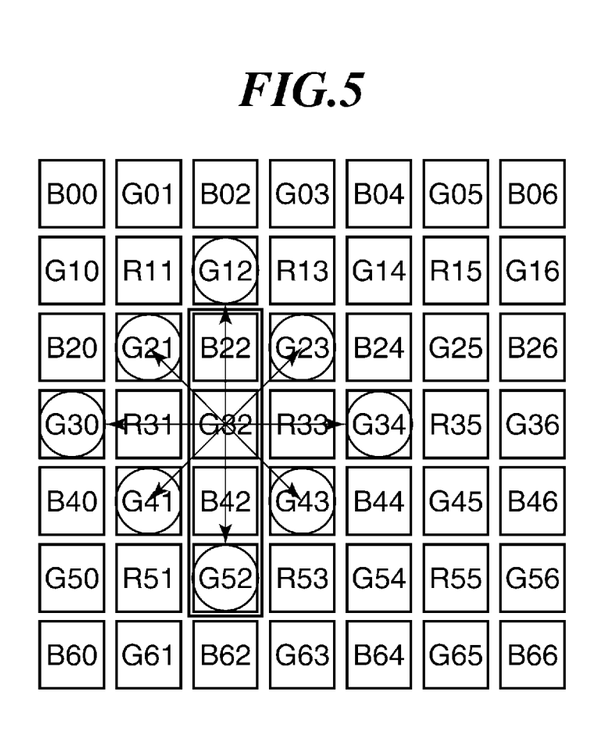
[FIG. 5] A view useful in explaining median filtering in four directions.

If it is determined in the step S3 that none of the pixels B22, B42, and G52 sharing the floating diffusion unit 211 with the detection target pixel G32 are defective pixels the addresses of which are stored in advance in the ROM 16, the system controller 15 causes the defective pixel-detecting section 81 to execute first defective pixel detection processing (step S5). More specifically, as shown in FIG. 5, median filtering in four directions is performed on the detection target pixel G32. FIG. 5 shows median filtering in the four directions.

After completion of the median filtering in the four directions, the defective pixel-detecting section 81 determines whether or not the detection target pixel G32 is a defective pixel (step S7). In the present embodiment, if the detection target pixel G32 has an output value larger than a predetermined threshold value, it is determined that the detection target pixel G32 is a defective pixel. Here, the predetermined threshold value used in the above determination is set as desired to a level at which the detection target pixel G32 cause a problem to the image compared with the other pixels.

Assuming that the predetermined threshold value for use in the determination of whether or not the detection target pixel G32 is a defective pixel is represented by TH, it is determined that the detection target pixel G32 is a defective pixel e.g. if the following numerical expressions (1) to (4) are all satisfied.

$$G32-\text{median}(G30,G32,G34)>TH \quad (1)$$

$$G32-\text{median}(G21,G32,G43)>TH \quad (2)$$

$$G32-\text{median}(G23,G32,G41)>TH \quad (3)$$

$$G32-\text{median}(G12,G32,G52)>TH \quad (4)$$

Image data obtained by median filtering is image data smoothed by removing high-frequency components there-from so as to eliminate the adverse influence of the defective pixel. Therefore, in the step S5, by performing subtraction processing for subtracting the smoothed image data from data of the detection target pixel, it is possible to obtain a prominent output value which is a noise component.

Note that when a defective pixel the address of which is stored in advance in the ROM 16 exists in a same color pixel range within which median filtering is performed, the defective pixel is handled as one to be excluded from calculation, and median filtering is performed using data of the pixels other than the defective pixel. This enables defective pixel detection to be performed with higher accuracy.

If it is determined in the step S7 that the detection target pixel G32 is a defective pixel, the system controller 15 performs the defective pixel correction processing using the defective pixel-correcting section 82 in the step S9, and then terminates the present process.

Figure 6:
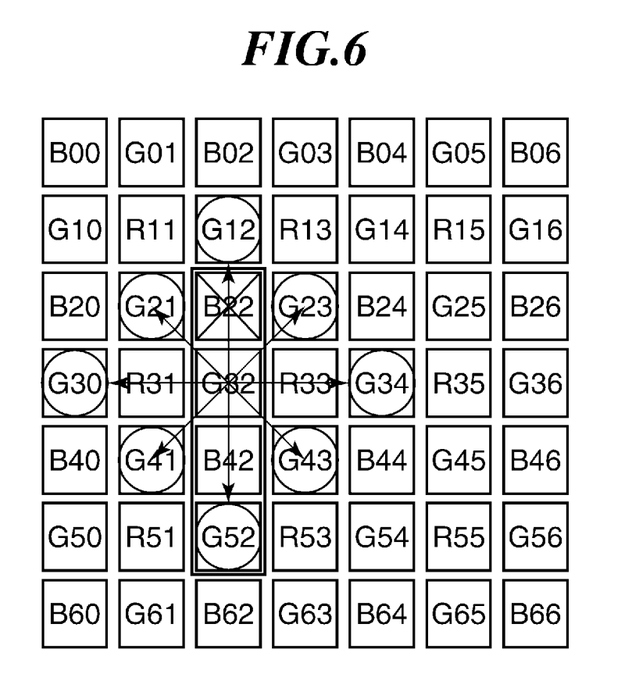
[FIG. 6] A view useful in explaining median filtering in a case where one of pixels B, B, and G sharing the floating diffusion unit with a pixel G32 is a defective pixel the address of which is stored in advance in a ROM.

Next, a description will be given of a case where it is determined in the step S3 that one of the pixels B22, B42, and G52 sharing the floating diffusion unit 211 with the pixel G32 is a defective pixel the address of which is stored in advance in the ROM 16. FIG. 6 is a view useful in explaining median filtering in the case where one of the pixels B22, B42, and G52 sharing the floating diffusion unit 211 with the pixel G32 is a defective pixel the address of which is stored in advance in the ROM 16.

For example, when only the pixel B22 of the pixels B22, B42, and G52 sharing the floating diffusion unit 211 with the pixel G32 is a defective pixel, the system controller 15 determines that the pixel B22 is only one defective pixel. In other words, the system controller 15 determines whether or not the number of the defective pixels is equal to 1 (step S4), and if the number of the defective pixels is equal to 1, the system controller 15 executes the above-described step S5 et seq. That is, similarly to the above-described case where none of the pixels sharing the floating diffusion unit 211 with the pixel G32 are defective pixels the addresses of which are stored in advance in the ROM 16, in the step S5, the system controller 15 performs median filtering in the four directions as the defective pixel detection processing, as shown in FIG. 6, and determines whether or not the pixel G32 is a defective pixel, using the numerical expressions (1) to (4). Then, if it is determined in the step S7 that the pixel G32 is a defective pixel, the system controller 15 performs the defective pixel correction processing in the step S9.

Figure 7:
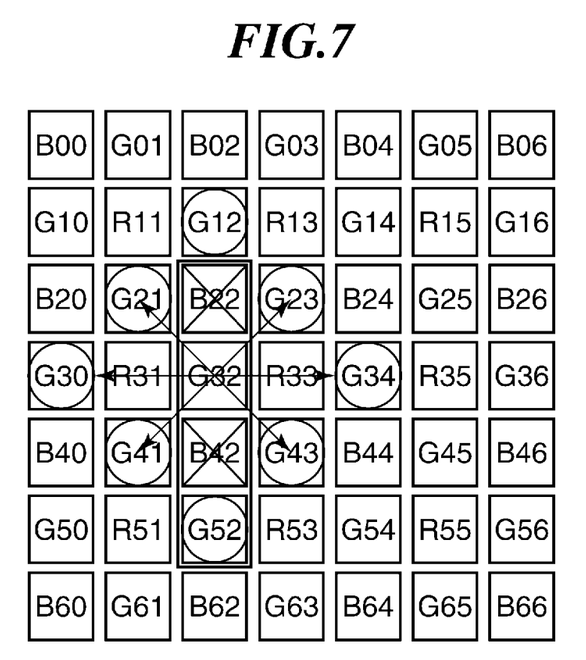
[FIG. 7] A view useful in explaining median filtering in a case where two of the pixels B, B, and G sharing the floating diffusion unit with the pixel G32 are defective pixels the addresses of which are stored in advance in the ROM.

Next, a description will be given of a case where two of the pixels B22, B42, and G52 sharing the floating diffusion unit 211 with the pixel G32 are defective pixels the addresses of which are stored in advance in the ROM 16. FIG. 7 is a view useful in explaining median filtering in the case where two of the pixels B22, B42, and G52 sharing the floating diffusion unit 211 with the pixel G32 are defective pixels the addresses of which are stored in advance in the ROM 16.

For example, when the pixels B22 and B42 of the three pixels B22, B42, and G52 sharing the floating diffusion unit 211 with the pixel G32 are defective pixels, since two of the four pixels sharing the floating diffusion unit 211 in the pixel structure are defective pixels, there is a high possibility that the floating diffusion unit 211 suffers from occurrence of a phenomenon that noise charge is sometimes caused by a structural factor and is applied in succession to the vertically-arranged four pixels which share the floating diffusion unit 211 between them, whereby it is determined that the pixel G52 as well has a high possibility of being a defective pixel.

Therefore, if it is determined in the step S4 that the number of the defective pixels is not equal to 1, i.e. not smaller than 2, the system controller 15 causes the defective pixel-detecting section 81 to execute second defective pixel detection processing different from the first defective pixel detection processing in the step S5. More specifically, as shown in FIG. 7, the system controller 15 performs median filtering in three directions except for the direction of arrangement of the pixels (B22, B42, and G52) sharing the floating diffusion unit 211 with the detection target pixel G32 (step S6). After execution of median filtering in the three directions, the defective pixel-detecting section 81 determines whether or not the detection target pixel G32 is a defective pixel (step S8). Note that this processing may be replaced by processing in which median filtering is performed in the four directions but the defective pixel-detecting section 81 does not refer to a result of median filtering in the direction of arrangement of the pixels sharing the floating diffusion unit 211 with the detection target pixel G32.

In other words, when it is determined whether or not the detection target pixel G32 is a defective pixel, the determination is performed by executing only the numerical expressions (1) to (3). Alternately, although calculation using the numerical expression (4) is also performed, the result of the calculation is not referred to. If the numerical expressions (1) to (3) are all satisfied, it is determined that the detection target pixel G32 is a defective pixel. If it is determined in the step S8 that the detection target pixel G32 is a defective pixel, in the step S9, the system controller 15 performs the defective pixel correction processing using the defective pixel-correcting section 82.

Figure 8:
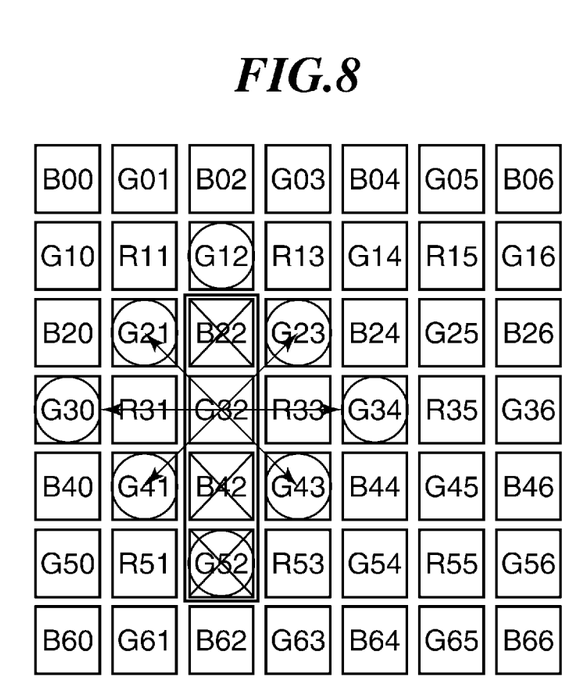
[FIG. 8] A view useful in explaining median filtering in a case where the pixels B, B, and G sharing the floating diffusion unit with the pixel G32 are defective pixels the addresses of which are stored in advance in the ROM.

Next, a description will be given of a case where all the pixels B22, B42, and G52 except for the detection target pixel G32, sharing the floating diffusion unit 211 with the pixel G32 are defective pixels the addresses of which are stored in advance in the ROM 16. FIG. 8 is a view useful in explaining median filtering in the case where the pixels B22, B42, and G52 sharing the floating diffusion unit 211 with the pixel 32 are defective pixels the addresses of which are stored in advance in the ROM 16.

As shown in FIG. 8, median filtering is performed in the three directions, and the determination of whether or not all the pixels B22, B42, and G52 are defective pixels is performed by executing only the numerical expressions (1) to (3). That is, when it is determined in the step S8 that all the pixels B22, B42, and G52 are defective pixels, the system controller 15 performs the defective pixel correction processing using the defective pixel-correcting section 82 in the step S9.

As described heretofore, according to the image pickup apparatus of the first embodiment, it is possible to perform defective pixel detection and obtain an excellent image, by taking into account a higher possibility that in the case of the image pickup device 3 comprising pixel groups each having a pixel structure in which pixels in each pixel group share part of electrical construction therebetween, if a pixel in the pixel group is a defective pixel, pixels in the pixel group other than the pixel are also defective pixels.

Although in the above-described embodiment, the description has been given of the case where the detection target pixel being subjected to defective pixel detection is a G pixel, the same processing as in the above-described case is performed also in cases where the detection target pixel is a B pixel or an R pixel, and hence description thereof is omitted.

Further, in the above-described embodiment, it is shown that in the case of a pixel structure in which each pixel group formed by four pixels arranged in the vertical direction share an associated floating diffusion unit 211, when two or more pixels including a pixel of the pixel group sharing the associated floating diffusion unit 211 are defective pixels information on which is stored in advance, median filtering in the vertical direction is ignored. However, the present invention is effective not only in the case where the pixel group has a pixel structure in which pixels arranged in one direction share the floating diffusion unit 211 but also in a case where the pixel group has a pixel structure in which pixels arranged in two directions share the floating diffusion unit 211. That is, when two or more pixels including a pixel of the pixel group sharing the associated floating diffusion unit 211 are defective pixels information on which is stored in advance, it is only required to ignore median filtering in the direction of arrangement of pixels having the same color.

Further, similarly, the present invention can be applied to a case where the number of pixels of a pixel group sharing the floating diffusion unit 211 is not smaller than four, by switching between two or more types of defective pixel detection processing.

Further, although in the present embodiment, median filtering is employed as the defective pixel detection processing, this is not limitative, but difference-based processing may be employed which is performed based on the difference between signal levels of a predetermined pixel and a same color pixel adjacent to the predetermined pixel. The same applies to the following embodiment.

Figure 9:
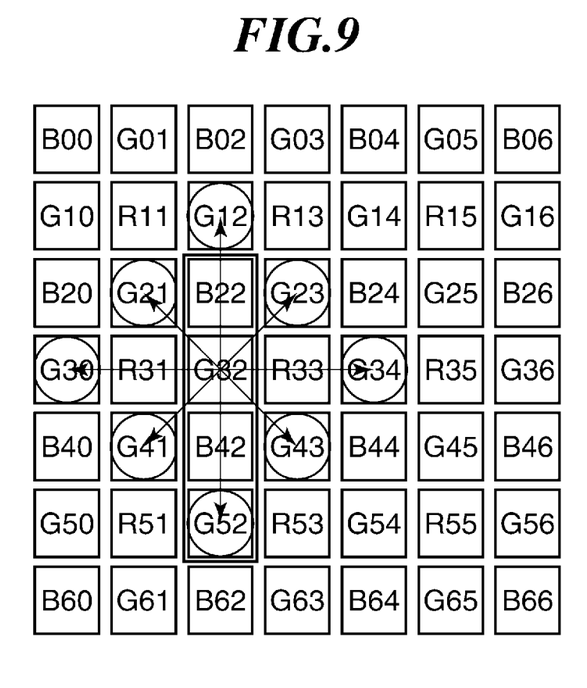
[FIG. 9] A view useful in explaining median filtering in four directions performed by an image pickup apparatus according to a second embodiment, as first defective pixel detection processing.
Figure 10:
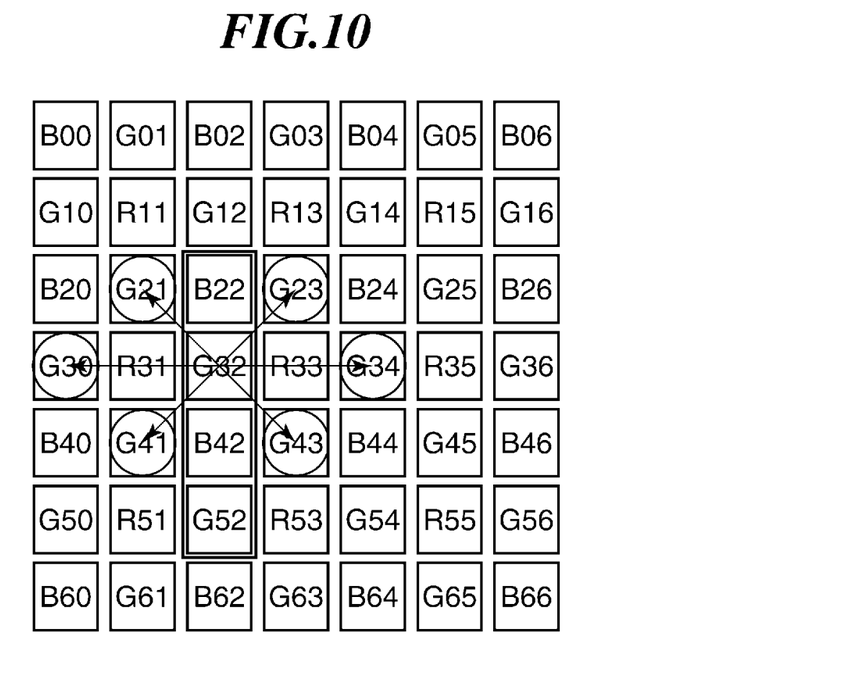
[FIG. 10] A view useful in explaining median filtering in three directions as second defective pixel detection processing.

Next, a description will be given of a second embodiment of the present invention. In the second embodiment, detection of a defective pixel is performed by weighted averaging in which results of two types of defective pixel detection processing are respectively weighted and averaged. FIG. 9 is a view useful in explaining median filtering in the four directions according to the second embodiment, as first defective pixel detection processing. FIG. 10 is a view useful in explaining median filtering in the three directions as second defective pixel detection processing. The configuration of the image pickup apparatus is the same as that of the above-described image pickup apparatus according to the first embodiment, and hence description thereof is omitted by using the same reference numerals.

Similarly to the first embodiment, the image pickup device 3 has a pixel structure in which the pixels B22, G32, B42, and G52 of a pixel group share an associated floating diffusion unit 211, and the detection target pixel being subjected to defective pixel detection is the pixel G32, by way of example.

Referring to FIG. 9, median filtering is performed in the four directions, and processing for subtracting image data smoothed according to a numerical expression (5) from data of the detection target pixel, whereby a prominent output value A which is a noise component is obtained.

$$G32 - \text{median}(G12, G21, G23, G30, G32, G34, G41, G43, G52) \quad (5)$$

Further, as shown in FIG. 10, the median filtering is performed in three directions except for the direction of arrangement of pixels sharing the floating diffusion unit 211 with the detection target pixel G32, and processing for subtracting image data smoothed according to a numerical expression (6) from data of the detection target pixel, whereby a prominent output value B which is a noise component is obtained.

$$G32 - \text{median}(G21, G23, G30, G32, G34, G41, G43) \quad (6)$$

Here, assuming that a predetermined threshold value used in the determination of a defective pixel is represented by TH, a sum value (weighted sum value) MIX obtained by weighted averaging of the output value A and the output value B is calculated e.g. by the following equation (7):

$$MIX = A \times K + B \times (1-K) \quad (7)$$

wherein a coefficient K represents a value from 0 to 1, which is determined by the number of defective pixels the addresses of which are stored in advance in the ROM 16 existing in a pixel group sharing the floating diffusion unit 211.

Figure 11:
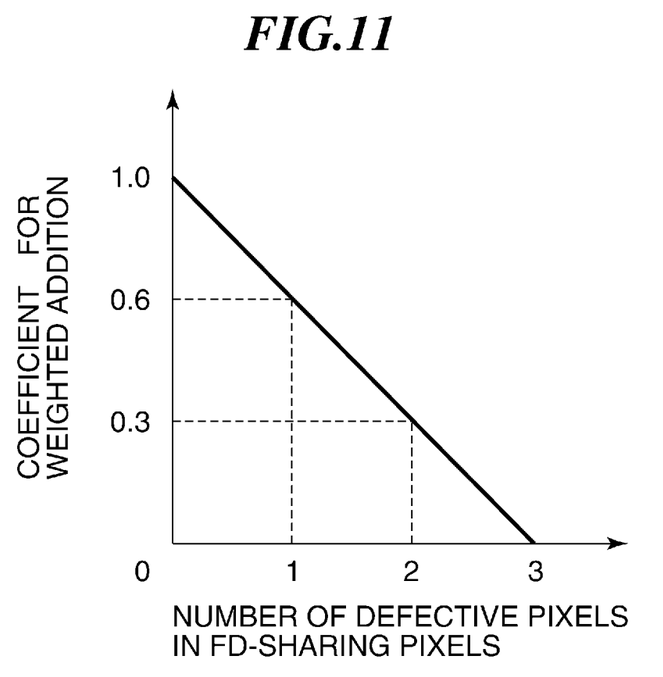
[FIG. 11] A graph showing an example of setting of a coefficient K.

FIG. 11 is a graph showing an example of the setting of the coefficient K. For example, when there is no defective pixel the address of which is stored in advance in the ROM 16, in the pixel group sharing the floating diffusion unit 211, K=1 is set, and an output value obtained by the median filtering in all the four directions is employed.

Further, when all the pixels B22, B42, and G52 except for the detection target pixel G32, which share the floating diffusion unit 211 with the pixel G32, are defective pixels the addresses of which are stored in advance in the ROM 16, K=0 is set, and an output value obtained by median filtering in the three directions is employed.

Furthermore, when one of the pixels B22, B42, and G52 sharing the floating diffusion unit 211 with the pixel G32 is a defective pixel the address of which is stored in advance in the ROM 16, there is a high possibility that it is only one defective pixel, and hence the coefficient K is set to a value close to 1, and an output value is employed which is obtained by attaching importance to the result of the median filtering in all the four directions. In the illustrated example, the coefficient K is set to 0.6.

On the other hand, when two of the pixels B22, B42, and G52 sharing the floating diffusion unit 211 with the pixel G32 are defective pixels the addresses of which are stored in advance in the ROM 16, there is a high possibility that noise charge is sometimes caused in the floating diffusion unit 211 due to a structural factor, and the noise charge is applied in succession to the vertically-arranged four pixels sharing the floating diffusion unit 211. Therefore, the coefficient K is set to a value close to 0, and an output value is employed which is obtained by attaching importance to the result of median filtering in three directions. In the illustrated example, the coefficient K is set to 0.3. As described hereinabove, in the present embodiment, the defective pixel is detected based on the result of addition using weighted averaging in which respective results of the two types of defective pixel detection processing are weighted.

Similarly to the first embodiment, assuming that a predetermined value (threshold value) used in the determination of a defective pixel is represented by TH, when the relationship between the predetermined value TH and the weighted sum value MIX obtained as above, expressed by the following numerical expression (8), is satisfied, it is determined that the detection target pixel G32 is a defective pixel.

$$MIX > TH \quad (8)$$

Here, if it is determined that there is a defective pixel the address of which is stored in advance in the ROM 16 in a same color pixel range within which median filtering is performed, the defective pixel is handled as one to be excluded from calculation (excluded from determination), and median filtering is performed using data of the pixels other than the defective pixel.

Further, although in the above-described embodiment, the number of pixels in each pixel group sharing the floating diffusion unit 211 with the detection target pixel being subjected to defective pixel detection is three, the present embodiment can also be applied to the case where the number of pixels in the pixel group is not smaller than four, as the second embodiment, by calculating a weighted sum value using a weighted sum value of results of two or more types of defective pixel detection processing.

Figure 12:
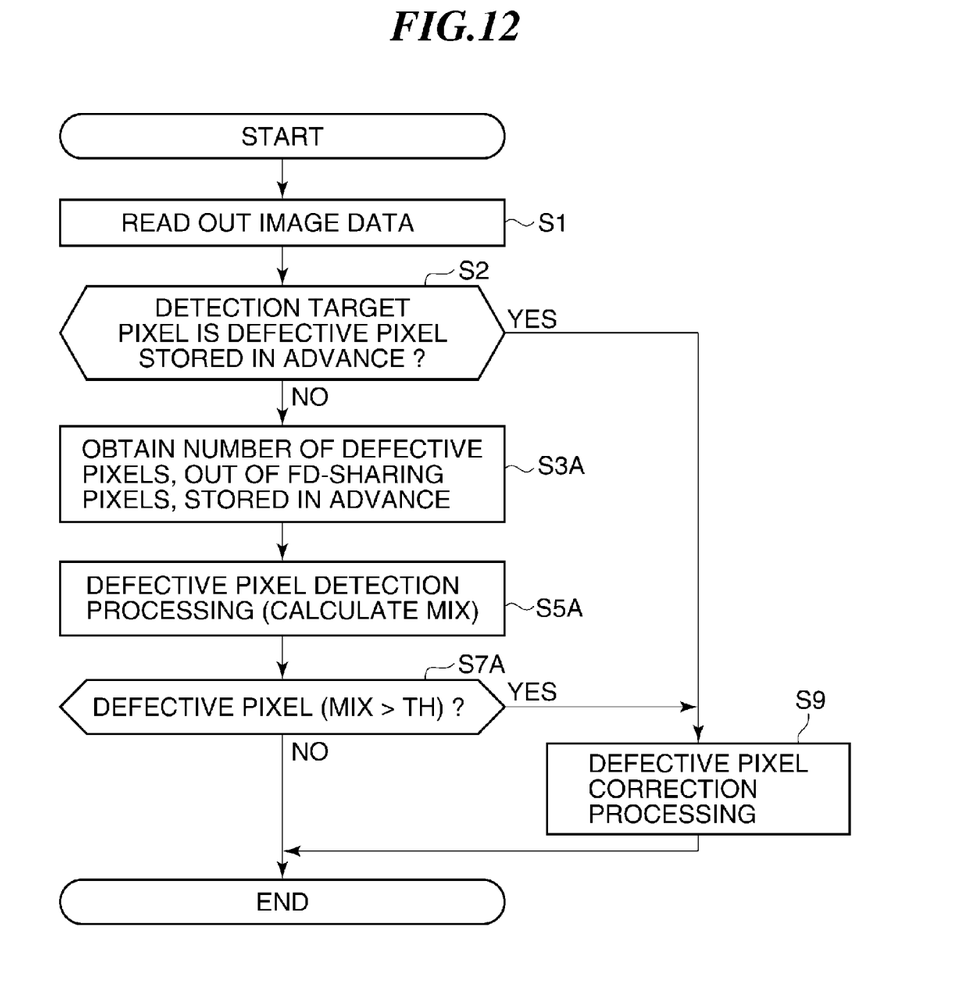
[FIG. 12] A flowchart of a defective pixel detection process in a case where the image pickup device comprises pixel groups each having a pixel structure in which pixels share part of electrical construction therebetween.

FIG. 12 is a flowchart of a defective pixel detection process in a case where the image pickup device 3 comprises pixel groups each having a pixel structure in which pixels in each pixel group share part of electrical construction therebetween. A program for this defective pixel detection process is stored in the ROM 16, as described above, and is executed by the system controller 15 (CPU). Description of steps identical to those in the defective pixel detection process shown in FIG. 4 of the first embodiment is omitted by designating the steps using identical step numbers.

If it is determined in the step S2 that the detection target pixel G32 is not a defective pixel, based on the defective pixel information stored in advance in the ROM 16, the system controller 15 obtains the number of defective pixels, out of the pixels sharing the floating diffusion unit 211, the addresses of which are stored in advance in the ROM 16 (step S3A).

The system controller 15 causes the defective pixel-detecting section 81 to execute the above-described plurality of types of defective pixel detection processing different from each other. Then, the system controller 15 calculates the weighted sum value MIX by the numerical expression (7) based on the number of the defective pixels obtained in the step S3A (step S5A). Based on the result of this calculation (addition), the system controller 15 determines whether or not the detection target pixel G32 is a defective pixel, i.e. whether or not the weighted sum value MIX of the detection target pixel G32 satisfies the numerical expression (8) (step S7A).

If the detection target pixel G32 is not a defective pixel, the system controller 15 immediately terminates the present process, whereas if the detection target pixel G32 is a defective pixel, the system controller 15 performs defective pixel correction processing using the defective pixel-correcting section 82. In this defective pixel correction processing, as described hereinabove, correction of the defective pixel is performed using a value obtained by pre-interpolation or interpolation from adjacent same color pixels.

As described heretofore, according to the second embodiment, it is possible to detect a defective pixel by causing the number of defective pixels, out of the pixels sharing the floating diffusion unit 211, stored in advance in the ROM 16 to be reflected to a further extent.

The present invention is not limited to the above-described embodiments, but can be modified in various manners based on the subject matter of the present invention, which should not be excluded from within the scope of the present invention insofar as functions as recited in the appended claims or the functions performed by the construction of each of the above described embodiments can be achieved.

Further, the present invention can be applied to not only color image pickup devices of colors of R, G, B, or the like, but also to a monochrome image pickup device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST 3 image pickup device
8 defective pixel-detecting & correcting unit
15 system controller
81 defective pixel-detecting section
82 defective pixel-correcting section
50 image pickup apparatus
211 floating diffusion unit

The invention claimed is:

1. An image pickup apparatus including a solid image pickup device for converting an optical image formed by a plurality of pixel groups arranged two-dimensionally to an electric signal and outputting the electric signal, each pixel group being formed by a plurality of pixels having a pixel structure in which two or more pixels share part of electrical construction therebetween, comprising:
   a storage unit configured to store position information on each of defective pixels;
   a defective pixel-detecting unit configured to detect a new defective pixel on which position information is not stored in said storage unit, out of the plurality of pixels forming the pixel group, by a plurality of different types of defective pixel detection processing; and
   a control unit configured to add respective results of the plurality of different types of defective pixel detection processing by weighted averaging dependent on the number of defective pixels which are included in each pixel group and on which the position information is stored in said storage unit and determine based on a result of the addition whether or not a detection target pixel is the new defective pixel.

2. The image pickup apparatus according to claim 1, wherein each pixel group is formed by a plurality of pixels arranged adjacent to each other in one direction,
   wherein the plurality of types of defective pixel detection processing include first defective pixel detection processing in which median filtering is performed in four directions including the one direction, and second defective pixel detection processing in which the median filtering is performed in three directions except for the one direction.

3. The image pickup apparatus according to claim 1, wherein the plurality of pixels of each pixel group share therebetween a holding unit configured to temporarily hold an electric charge generated in each pixel of the pixel group.

4. The image pickup apparatus according to claim 2, wherein the plurality of pixels of each pixel group share therebetween a holding unit configured to temporarily hold an electric charge generated in each pixel of the pixel group.

5. A method of detecting a defective pixel for an image pickup apparatus including a solid image pickup device for converting an optical image formed by a plurality of pixel groups arranged two-dimensionally to an electric signal and outputting the electric signal, each pixel group being formed by a plurality of pixels having a pixel structure in which two or more pixels share part of electrical construction therebetween, comprising:
   detecting a new defective pixel on which position information is not stored in a storage unit, out of the plurality of pixels forming each pixel group, by a plurality of different types of defective pixel detection processing; and
   adding respective results of the plurality of different types of defective pixel detection processing by weighted averaging dependent on the number of defective pixels which are included in each pixel group and on which the position information is stored in said storage unit and determining based on a result of the addition whether or not a detection target pixel is the new defective pixel.

* * * * *